US012792250B2

(12) United States Patent
Park et al.

(10) Patent No.: US 12,792,250 B2

(45) Date of Patent: Nov. 10, 2026

(54) SYSTEMS, METHODS, AND APPARATUS FOR PAGE MIGRATION IN MEMORY SYSTEMS

(71) Applicant: Samsung Electronics Co., Ltd., Suwon-si (KR)

(72) Inventors: Heekwon Park, San Jose, CA (US); Rekha Pitchumani, Oak Hill, VA (US)

(73) Assignee: SAMSUNG ELECTRONICS CO., LTD. (KR)

(*) Notice: Subject to any disclaimer, the term of this patent is extended or adjusted under 35 U.S.C. 154(b) by 0 days.

(21) Appl. No.: 17/393,399

(22) Filed: Aug. 3, 2021

(65) Prior Publication Data

US 2022/0382478 A1 Dec. 1, 2022

Related U.S. Application Data

(60) Provisional application No. 63/195,708, filed on Jun. 1, 2021.

(51) Int. Cl.

*G06F 3/00* (2006.01)
*G06F 3/06* (2006.01)
*G06F 12/00* (2006.01)

(52) U.S. Cl.

CPC .......... *G06F 3/0647* (2013.01); *G06F 3/0604* (2013.01); *G06F 3/0679* (2013.01)

(58) Field of Classification Search

CPC ..... G06F 3/0647; G06F 3/0604; G06F 3/0679

(Continued)

(56) References Cited

U.S. PATENT DOCUMENTS 6,021,446 A * 2/2000 Gentry, Jr. .............. G06F 9/544 710/264
6,067,584 A * 5/2000 Hayles ...................... G06F 9/44 710/10

(Continued)

FOREIGN PATENT DOCUMENTS

CN 108572799 A 9/2018
KR 20110002742 A 1/2011

(Continued)

OTHER PUBLICATIONS

European Extended Search Report for Application No. 22171317.5, mailed Oct. 13, 2022.

(Continued)

*Primary Examiner* — Sheng Jen Tsai
(74) *Attorney, Agent, or Firm* — Renaissance IP Law Group LLP

(57) ABSTRACT

A method for managing a memory system may include monitoring a page of a first memory of a first type, determine a usage of the page based on the monitoring, and migrating the page to a second memory of a second type based on the usage of the page. Monitoring the page may include monitoring a mapping of the page. Monitoring the mapping of the page may include monitoring a mapping of the page from a logical address to a physical address. Determining the usage of the page may include determining an update frequency of the page. Determining the usage of the page may include comparing the update frequency of the page to a threshold. Migrating the page may include sending an interrupt to a device driver. Migrating the page may include setting a write protection status for the page.

21 Claims, 6 Drawing Sheets

(58) Field of Classification Search
USPC .......................................................... 711/154
See application file for complete search history.

(56) References Cited

U.S. PATENT DOCUMENTS

| | | | | |
|---|---|---|---|---|
| 6,096,094 | A * | 8/2000 | Kay ...................... | G06F 9/4411 717/168 |
| 6,434,187 | B1 * | 8/2002 | Beard .................... | H04B 1/403 375/326 |
| 7,269,708 | B2 * | 9/2007 | Ware ....................... | G06F 12/10 711/E12.058 |
| 7,484,208 | B1 * | 1/2009 | Nelson .................. | G06F 3/0647 718/1 |
| 7,917,688 | B2 * | 3/2011 | Tanaka .................. | G06F 1/3296 711/E12.008 |
| 8,296,496 | B2 | 10/2012 | Mogul et al. | |
| 8,543,778 | B2 * | 9/2013 | Emaru .................. | G06F 3/0665 711/117 |
| 8,725,927 | B2 | 5/2014 | Manning | |
| 9,367,311 | B2 * | 6/2016 | Yamashita .............. | G06F 8/451 |
| 9,547,443 | B2 * | 1/2017 | Hayashi ................ | G06F 3/0611 |
| 9,576,604 | B1 * | 2/2017 | Inamura ............... | G11B 19/041 |
| 9,798,487 | B2 * | 10/2017 | Duluk, Jr. ............. | G06F 3/0647 |
| 9,836,243 | B1 * | 12/2017 | Chanler ............. | G11C 16/3495 |
| 9,965,356 | B2 | 5/2018 | Li | |
| 9,996,273 | B1 * | 6/2018 | Sardella .................. | G06F 3/065 |
| 10,126,971 | B1 * | 11/2018 | Jain ....................... | G06F 3/0685 |
| 10,191,855 | B2 | 1/2019 | Sampathkumar et al. | |
| 10,430,347 | B2 * | 10/2019 | King ....................... | G06F 12/08 |
| 10,437,486 | B2 | 10/2019 | Choi et al. | |
| 10,445,246 | B2 * | 10/2019 | Yoshida .............. | G06F 12/0246 |
| 10,642,505 | B1 * | 5/2020 | Kuzmin ................ | G06F 3/0679 |
| 11,042,305 | B2 | 6/2021 | Kanno et al. | |
| 11,132,133 | B2 | 9/2021 | Dedrick | |
| 11,138,124 | B2 * | 10/2021 | Tomic ..................... | G06F 9/505 |
| 11,232,042 | B2 * | 1/2022 | Venkataraman .... | G06F 12/1009 |
| 11,275,695 | B1 * | 3/2022 | Lercari ............... | G06F 12/0246 |
| 11,347,639 | B1 * | 5/2022 | Kuzmin .............. | G06F 12/0246 |
| 11,347,843 | B2 * | 5/2022 | Suwad .................... | G06F 21/52 |
| 2003/0079007 | A1 * | 4/2003 | Merkin ............... | G06F 11/0745 709/251 |
| 2003/0088653 | A1 * | 5/2003 | Wilks .................. | H04L 61/5038 709/223 |
| 2003/0093601 | A1 * | 5/2003 | Pereira ................... | G11B 27/36 |
| 2003/0125908 | A1 * | 7/2003 | Wynn ..................... | G06F 11/26 702/186 |
| 2004/0006716 | A1 * | 1/2004 | Schuckle .................. | G06F 1/32 713/300 |
| 2004/0221130 | A1 * | 11/2004 | Lai ...................... | G06F 12/0292 711/103 |
| 2005/0235131 | A1 * | 10/2005 | Ware ....................... | G06F 12/10 711/156 |
| 2005/0251785 | A1 * | 11/2005 | Vertes ................. | G06F 11/2097 714/E11.073 |
| 2007/0288721 | A1 * | 12/2007 | Kruger ................ | G06F 12/1027 711/E12.057 |
| 2008/0301256 | A1 * | 12/2008 | McWilliams ....... | G06F 12/0246 714/E11.178 |
| 2009/0113109 | A1 * | 4/2009 | Nelson ................ | G06F 11/1484 718/1 |
| 2010/0318724 | A1 * | 12/2010 | Yeh ..................... | G06F 12/0246 711/E12.008 |
| 2011/0078363 | A1 * | 3/2011 | Yeh ..................... | G06F 12/0246 711/E12.001 |
| 2011/0167236 | A1 * | 7/2011 | Orikasa ................... | G06F 3/061 711/E12.002 |
| 2011/0246739 | A1 * | 10/2011 | Matsuda ............... | G06F 3/0665 711/E12.002 |
| 2012/0042034 | A1 * | 2/2012 | Goggin ................. | G06F 3/0647 709/216 |
| 2013/0179666 | A1 * | 7/2013 | Yamashita ............ | G06F 9/3891 712/228 |
| 2013/0198437 | A1 * | 8/2013 | Omizo ................ | G06F 12/0246 711/103 |
| 2014/0059275 | A1 * | 2/2014 | Yun ..................... | G06F 12/0246 711/103 |
| 2014/0108759 | A1 * | 4/2014 | Iwamitsu .............. | G06F 3/0685 711/165 |
| 2014/0289486 | A1 | 9/2014 | Katori et al. | |
| 2015/0058553 | A1 * | 2/2015 | Wu ..................... | G06F 12/0888 711/113 |
| 2015/0193250 | A1 * | 7/2015 | Ito ......................... | G06F 9/4856 718/1 |
| 2015/0199126 | A1 * | 7/2015 | Jayasena ............. | G06F 12/0292 711/170 |
| 2015/0220280 | A1 * | 8/2015 | Ishizaki ................ | G06F 3/0619 711/114 |
| 2015/0347311 | A1 * | 12/2015 | Tanaka ................ | G06F 12/0873 711/118 |
| 2016/0210167 | A1 * | 7/2016 | Bolic .................. | G06F 9/45558 |
| 2016/0327602 | A1 * | 11/2016 | Subramanian ......... | G01R 31/69 |
| 2016/0342339 | A1 * | 11/2016 | Leidel ................... | G06F 3/0608 |
| 2016/0378688 | A1 * | 12/2016 | Rozas ................. | G06F 12/1441 713/190 |
| 2017/0046186 | A1 * | 2/2017 | Tsirkin ................ | G06F 9/45533 |
| 2017/0083372 | A1 * | 3/2017 | Lin ....................... | G06F 3/0685 |
| 2017/0139768 | A1 * | 5/2017 | Camp .................. | G06F 3/0647 |
| 2017/0160955 | A1 | 6/2017 | Jayasena et al. | |
| 2017/0285940 | A1 * | 10/2017 | Benisty ............... | G06F 12/0871 |
| 2018/0060100 | A1 * | 3/2018 | Tsirkin .................. | G06F 9/5088 |
| 2018/0081816 | A1 * | 3/2018 | Coburn ............... | G06F 12/0868 |
| 2018/0107598 | A1 * | 4/2018 | Prodromou ......... | G06F 12/0811 |
| 2018/0232173 | A1 * | 8/2018 | Chung .................. | G06F 3/0685 |
| 2018/0253468 | A1 * | 9/2018 | Gurajada ............ | G06F 11/1471 |
| 2018/0349287 | A1 * | 12/2018 | Kan .................... | G06F 12/0246 |
| 2019/0004944 | A1 * | 1/2019 | Widder ............... | G06F 12/0246 |
| 2019/0171387 | A1 | 6/2019 | Willhalm et al. | |
| 2020/0057729 | A1 | 2/2020 | Liu et al. | |
| 2020/0097313 | A1 * | 3/2020 | Dong .................. | G06F 12/1036 |
| 2020/0117527 | A1 * | 4/2020 | Tomic ................. | G06F 12/0246 |
| 2020/0249861 | A1 * | 8/2020 | Venkat .................... | G06F 3/067 |
| 2020/0310654 | A1 * | 10/2020 | Meiri .................... | G06F 3/0653 |
| 2021/0055990 | A1 | 2/2021 | Iwasaki et al. | |
| 2021/0064531 | A1 | 3/2021 | Bernat et al. | |
| 2021/0081325 | A1 * | 3/2021 | Bradshaw ............. | G06F 9/5077 |
| 2021/0081326 | A1 * | 3/2021 | Curewitz ............ | G06F 12/0284 |
| 2021/0096898 | A1 * | 4/2021 | Tsirkin .................... | G06F 12/10 |
| 2021/0133070 | A1 * | 5/2021 | Pletka ................. | G06F 12/0246 |
| 2021/0303477 | A1 * | 9/2021 | Doshi ................. | G06F 12/0813 |
| 2022/0206700 | A1 * | 6/2022 | Ng ......................... | G06F 3/0647 |
| 2022/0236916 | A1 * | 7/2022 | Esaka ................... | G06F 3/0659 |
| 2023/0033549 | A1 * | 2/2023 | Bradshaw ........... | G06F 12/1009 |
| 2023/0297411 | A1 * | 9/2023 | Tsirkin .................... | G06F 12/10 718/1 |
| 2024/0094903 | A1 * | 3/2024 | Kavirayani ........... | G06F 3/0631 |
| 2024/0248854 | A1 * | 7/2024 | Bradshaw ............. | G06F 9/5077 |

FOREIGN PATENT DOCUMENTS

| | | | |
|---|---|---|---|
| TW | 201741889 | A | 12/2017 |
| TW | 201812584 | A | 4/2018 |
| TW | 201918885 | A | 5/2019 |
| TW | 201945921 | A | 12/2019 |

OTHER PUBLICATIONS

European Office Action for Application No. 22171317.5, mailed Oct. 6, 2025.

* cited by examiner

SYSTEMS, METHODS, AND APPARATUS FOR PAGE MIGRATION IN MEMORY SYSTEMS

CROSS-REFERENCE TO RELATED APPLICATIONS

This application claims priority to, and the benefit of, U.S. Provisional Patent Application Ser. No. 63/195,708 titled "Systems, Methods, and Devices for Page Migration in Memory Systems" filed Jun. 1, 2021 which is incorporated by reference.

TECHNICAL FIELD

This disclosure relates generally to memory systems, and more specifically to systems, methods, and apparatus for page migration in memory systems.

BACKGROUND

In some embodiments, a heterogeneous memory system may use two or more types of memory, each of which may be adapted for a specific purpose. For example, a heterogeneous memory system may include nonvolatile memory which may retain data across power cycles. As another example, a heterogeneous memory system may include volatile memory which may be updated frequently without lifetime wear limitations.

The above information disclosed in this Background section is only for enhancement of understanding of the background of the invention and therefore it may contain information that does not constitute prior art.

SUMMARY

A method for managing a memory system may include monitoring a page of a first memory of a first type, determining a usage of the page based on the monitoring, and migrating the page to a second memory of a second type based on the usage of the page. Monitoring the page may include monitoring a mapping of the page. Monitoring the mapping of the page may include monitoring a mapping of the page from a logical address to a physical address. Determining the usage of the page may include determining an update frequency of the page. Determining the usage of the page may include comparing the update frequency of the page to a threshold. Migrating the page may include sending an interrupt to a device driver. Migrating the page may include setting a write protection status for the page. Migrating the page may further include migrating the page, by a page fault handler, based on the write protection status. Migrating the page, by the page fault handler, may be based on writing the page. The first memory may include a device-attached memory. The device-attached memory may be exposed via a memory protocol. The memory protocol may include a coherent memory protocol. The method may further include storing usage information for the page in the device-attached memory. The page may be migrated by a host, and the method may further include updating, by the host, the usage information for the page based on migrating the page. The first memory may include a nonvolatile memory, and the second memory may include a volatile memory.

A device may include a memory, and a device controller configured to monitor a page of the memory, determine a usage of the page based on the monitoring, and send an indication based on the usage of the page. The device controller may be configured to monitor the page by monitoring a mapping of the page. The device controller may be configured to monitoring the mapping of the page by monitoring a logical address to physical address mapping of the page. The device controller may be configured to determine the usage of the page by determining an update frequency of the page. The device controller may be configured to determine the usage of the page by comparing the update frequency of the page to a threshold. The device controller may be configured to send an interrupt based on the usage of the page. The device may include a storage device, and the memory may include a nonvolatile memory. The memory may be exposed via a memory protocol. The memory protocol may include a coherent memory protocol. The device controller may be configured to store usage information for the page in the memory. The device controller may be configured to receive an update message, and update the usage information based on the update message.

A system may include a host processor, a first memory of a first type arranged to be accessed by the host processor, and a device interface configured to expose a second memory of a second type to the host processor, and migration logic configured to receive a migration message, and migrate a page of the second memory to the first memory based on the migration message. The migration logic may include a device driver configured to receive the migration message. The device driver may be configured to set a write protection status for the page based on the migration message. The device driver may be configured to set the write protection status in a page table entry for the page. The migration logic may include a page fault handler configured to migrate the page from the second memory to the first memory. The migration logic may be configured to send an update message through a device interface based on migrating the page from the second memory to the first memory.

BRIEF DESCRIPTION OF THE DRAWINGS

The figures are not necessarily drawn to scale and elements of similar structures or functions may generally be represented by like reference numerals or portions thereof for illustrative purposes throughout the figures. The figures are only intended to facilitate the description of the various embodiments described herein. The figures do not describe every aspect of the teachings disclosed herein and do not limit the scope of the claims. To prevent the drawings from becoming obscured, not all of the components, connections, and the like may be shown, and not all of the components may have reference numbers. However, patterns of component configurations may be readily apparent from the drawings. The accompanying drawings, together with the specification, illustrate example embodiments of the present disclosure, and, together with the description, serve to explain the principles of the present disclosure.

DETAILED DESCRIPTION

In a heterogeneous memory system in accordance with example embodiments of the disclosure, a memory page may be migrated from a first type of memory (e.g., nonvolatile memory) to a second type of memory (e.g., volatile memory) based on determining a usage pattern for the memory page. For example, usage patterns of one or more pages of the nonvolatile memory may be monitored to identify pages that may be accessed more frequently than other pages. Pages that are determined to be accessed frequently (which may be referred to as hot pages) may be migrated from nonvolatile memory to volatile memory, for example, to reduce page writes (which may increase the lifetime of the nonvolatile memory), to improve system performance (e.g., by balancing loads), and/or the like.

In some embodiments, the first type of memory (e.g., nonvolatile memory) may be implemented as device-attached memory at a storage device such as a solid state drive (SSD). The usage patterns of one or more pages of the device-attached memory may be monitored at the SSD, for example, by monitoring changes in logical-to-physical (L2P) mappings of the memory pages. A specific page may be determined to be a hot page, for example, if the L2P mappings of the specific page are updated more frequently than a threshold level that may be determined, for example, based on an average of some or all pages of the SSD. The SSD may initiate a migration of one or more hot pages, for example, by issuing an interrupt to a device driver at a host.

In some embodiments, a hot page may be migrated from the first type of memory to the second type of memory using a page fault handler. For example, a device driver for a storage device having the device-attached memory may set a write protect status for one or more pages of the first type of memory that have been determined to be hot pages. A subsequent write to one of the write protected pages may cause the page fault handler to migrate the accessed page from the first type of memory to the second type of memory. In some embodiments, a write protect status may be set for a hot page, for example, by setting a write protection bit in a page table entry pointing to the hot page.

In some embodiments, information for monitoring the usage patterns of one or more pages of the device-attached memory may be stored in the device-attached memory. For example, a portion of the device-attached memory may be reserved for a write count or other metric that may be used to determine the usage pattern. The reserved portion may be accessible by the device and/or the host. For example, the device may update a write count for each page when an L2P mapping for the page changes. The host may reset the write count for a page when the page is deallocated and therefore may no longer be used by an application and/or a process at the host.

Figure 1:
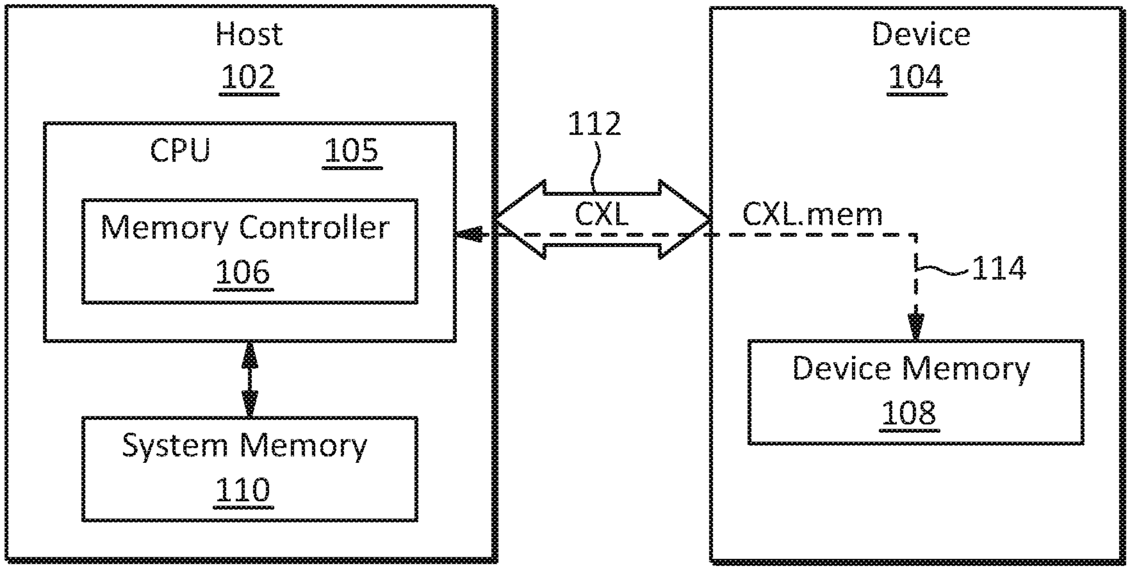
FIG. 1 illustrates an example embodiment of a system in which a host may access device-attached memory in accordance with example embodiments of the disclosure.

FIG. 1 illustrates an example embodiment of a system in which a host may access device-attached memory in accordance with example embodiments of the disclosure. The system illustrated in FIG. 1 may include a host 102 and a device 104. The host 102 may include a central processing unit (CPU) 105 having a memory controller 106, and a system memory 110. In some embodiments, the CPU 105 may execute software such as a device driver, a page fault handler, and/or other system software as described below. The system memory 110 may be implemented with any type of memory, for example, volatile memory such as dynamic random access memory (DRAM), static random access memory (SRAM), and/or the like. In other embodiments, however, any other type of memory may be used.

The device 104 may include a device memory 108. The device 104 may be implemented, for example, as a storage device such as a solid state drive (SSD) in which the device memory 108 may be implemented with nonvolatile memory (NVM) such as NAND flash memory. In other embodiments, however, any other type of device 104 and/or device memory 108 may be used.

The host 102 and device 104 may communicate through any type of interconnect 112 such as Compute Express Link (CXL). The host 102 may access the device memory 108 through the interconnect 112 using any type of protocol. In the embodiment illustrated in FIG. 1, the host 102 may access the device memory 108 using the CXL.mem protocol 114 which may operate over the CXL interconnect 112. The CXL.mem protocol may expose the device memory to the host 102 in a manner that may enable the host 102 to access the device memory 108 as if it were part of the system memory 110.

The configuration of components illustrated in FIG. 1 are exemplary only, and they may be arranged differently in other embodiments. For example, in other embodiments, the memory controller 106 and or the system memory shown 110 may be implemented separately from the host 102.

Figure 2:
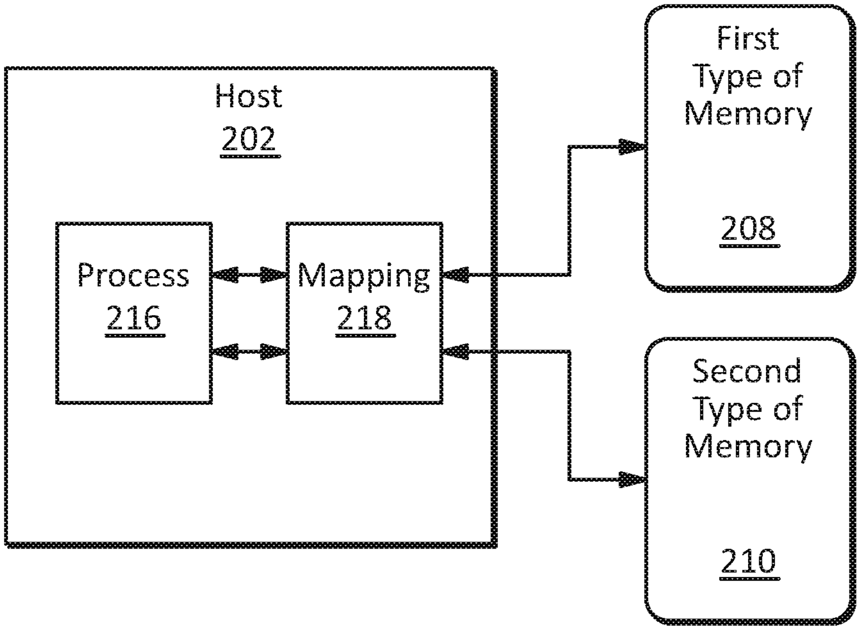
FIG. 2 illustrates an example embodiment of a heterogeneous memory scheme in accordance with example embodiments of the disclosure.

FIG. 2 illustrates an example embodiment of a heterogeneous memory scheme in accordance with example embodiments of the disclosure. The memory scheme illustrated in FIG. 2 may be implemented, for example, using the system illustrated in FIG. 1, but the memory scheme illustrated in FIG. 2 may be implemented with other systems as well.

The memory scheme illustrated in FIG. 2 may include a first type of memory 208, a second type of memory 210, and a host 202 that may use the first type of memory 208 and the second type of memory 210. The first type of memory 208 may be implemented, for example, as nonvolatile memory such as NAND flash memory. The second type of memory 210 may be implemented, for example, as volatile memory such as dynamic random access memory (DRAM).

In some embodiments, some or all of the first type of memory 208 may be implemented as device-attached memory, while some or all of the second type of memory 210 may be implemented as system memory. The device-attached memory may be exposed to the host 202 through an interconnect and/or protocol such as the CXL and/or CXL.mem. In some embodiments, the use of a coherent memory protocol such as CXL.mem may enable the device-attached memory to appear as system memory to the host 202. The first type of memory 208 and the second type of memory 210 may be mapped to one or more processes 216 running on the host 202 through a mapping scheme 218.

In the configuration illustrated in FIG. 2, one or more processes 216 running on the host 202 may use the first type of memory 208 in a manner that may reduce the lifetime of the first type of memory 208 and/or cause load imbalances that may degrade system performance. For example, in some embodiments, one or more pages of the first type of memory 208 may be written frequently by a process 216. However, because the first type of memory 208 may wear out after a limited number of writes, frequent updates may reduce the lifetime of the first type of memory 208.

Moreover, because the first type of memory 208 may be implemented as device-attached memory rather than system memory, the host 202 may not have access to information that may affect the lifetime and/or performance of the first type of memory 208. For example, if the device-attached memory 208 is implemented with nonvolatile memory in a solid state drive (SSD), frequent page updates may increase the number of invalid pages which may trigger frequent garbage collection. This, in turn, may reduce the lifetime of the nonvolatile memory. Moreover, frequent page updates may degrade system performance, for example, by increasing tail latency that may occur when an application, after issuing multiple access requests to the device-attached memory 208, may wait for the longest latency request to complete.

Figure 3:
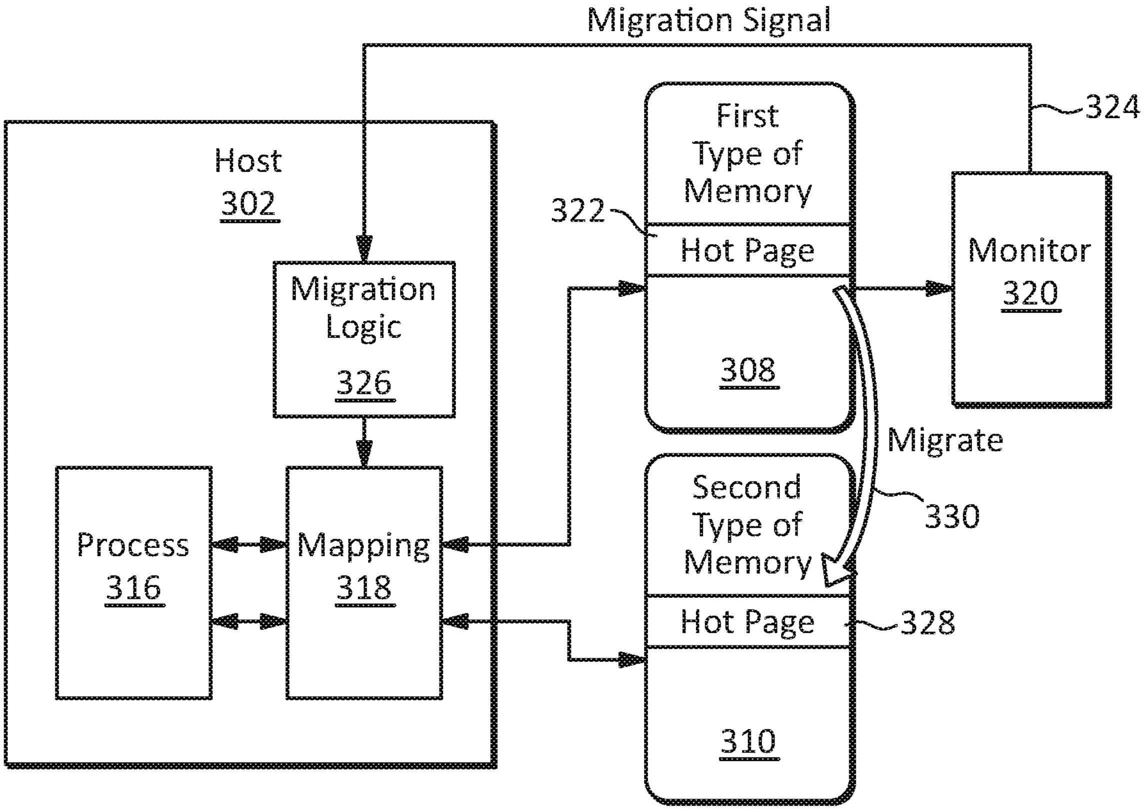
FIG. 3 illustrates an example embodiment of a heterogeneous memory scheme having page migration in accordance with example embodiments of the disclosure.

FIG. 3 illustrates an example embodiment of a heterogeneous memory scheme having page migration in accordance with example embodiments of the disclosure. The embodiment illustrated in FIG. 3 may include a first type of memory 308, a second type of memory 310, and a host 302 arranged in a configuration similar to that illustrated in FIG. 2. However, the embodiment illustrated in FIG. 3 may also include a monitoring process 320 that may monitor one or more pages 322 of the first type of memory 308 to determine one or more usage patterns of the one or more pages 322. For example, the monitoring process 320 may determine that one or more of the pages 322 may be hot pages that may be accessed frequently by a process 316 running on the host 302. The monitoring process 320 may send a migrate signal 324 to migration logic 326 at the host 302 identifying one or more pages 322 that may be hot pages. The migration logic 326 may then control the mapping scheme 318 to migrate the one or more hot pages 322 from the first type of memory 308 to the second type of memory 310 by remapping the one or more hot pages to one or more locations 328 in the second type of memory 310 as shown by arrow 330.

Depending on the implementation details, the memory scheme illustrated in FIG. 3 may extend the lifetime of the first type of memory 308 and/or improve system performance. For example, if the first type of memory 308 is implemented as flash memory, and the second type of memory 310 is implemented as DRAM, the one or more hot pages 328 that have been migrated to DRAM may be frequently rewritten without reducing the life of the flash memory and/or without introducing additional latencies.

For purposes of illustration, some embodiments may be described in the context of device-attached memory. However, the principles relating to hot page migration may be applied in any memory context in which a hot page may be migrated from a first type of memory to a second type of memory. For example, the principles may be applied to an embodiment in which the second type of memory may be implemented as system memory rather than device-attached memory. Moreover, the principles may be applied to any types of memory having different characteristics that may benefit from migrating one or more pages from one type of memory to another type of memory based on monitoring and determining a usage pattern of the memory.

For purposes of illustration, some embodiments may be described in the context of CXL interfaces and/or protocols. However, embodiments may also be implemented with any other interfaces and/or protocols including cache coherent and/or memory semantic interfaces and/or protocols such as Gen-Z, Coherent Accelerator Processor Interface (CAPI), Cache Coherent Interconnect for Accelerators (CCIX), and/or the like. Other examples of suitable interfaces and/or protocols may include Peripheral Component Interconnect Express (PCIe), Nonvolatile Memory Express (NVMe), NVMe-over-fabric (NVMe-oF), Ethernet, Transmission Control Protocol/Internet Protocol (TCP/IP), remote direct memory access (RDMA), RDMA over Converged Ethernet (ROCE), FibreChannel, InfiniBand, Serial ATA (SATA), Small Computer Systems Interface (SCSI), Serial Attached SCSI (SAS), iWARP, and/or the like, or combination thereof.

Figure 4:
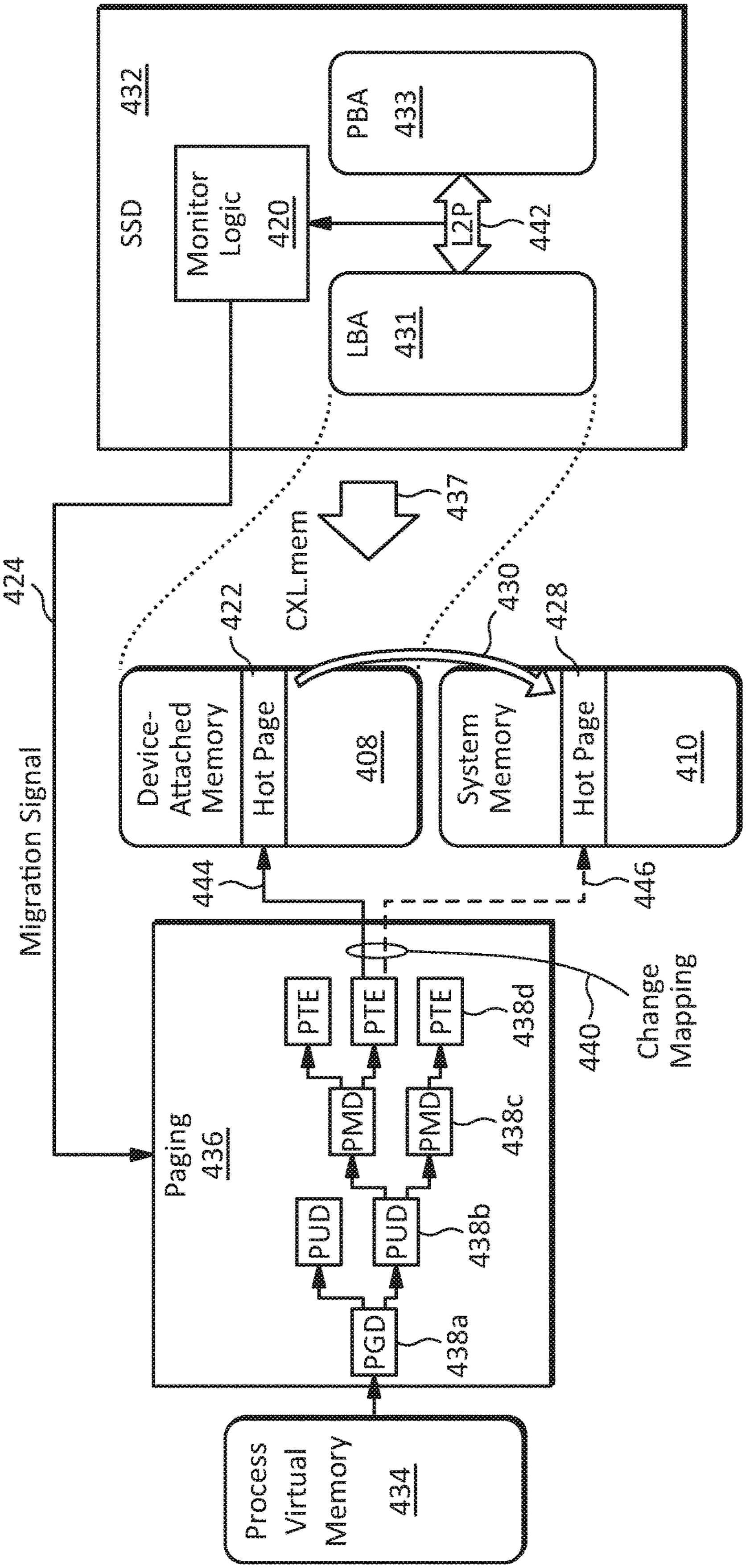
FIG. 4 illustrates another example embodiment of a heterogeneous memory scheme having page migration in accordance with example embodiments of the disclosure.

FIG. 4 illustrates another example embodiment of a heterogeneous memory scheme having page migration in accordance with example embodiments of the disclosure. The memory scheme illustrated in FIG. 4 may include a device-attached memory 408 and a system memory 410. In this example, the device-attached memory 408 may be implemented with flash memory in an SSD 432 that may be exposed via a memory protocol such as CXL.mem. In this example, the system memory 410 may be implemented with volatile memory such as DRAM.

The device-attached memory 408 and system memory 410 may be mapped to a process virtual memory 434 using a paging scheme 436 with one or more page tables 438 that may provide a mapping to the device-attached memory 408 and system memory 410. In the example illustrated in FIG. 4, four-level paging may be used (e.g., page global directory (PGD) 438*a*, page upper directory (PUD) 438*b*, page middle directory (PMD) 438*c*, and page table entry (PTE) 438*d*), but other paging schemes may be used. The process virtual memory 434 may be used, for example, by one or more processes running on a host such as any of the hosts illustrated in FIG. 1, FIG. 2, and/or FIG. 3.

Referring again to FIG. 4, the SSD 432 may include monitor logic 420 that may monitor a logical block address (LBA) 431 to physical block address (PBA) 433 mapping 442 of flash memory in the SSD 432. The LBA-to-PBA mapping may also be referred to as an L2P mapping 442. The LBA 431 may expose the flash memory in the SSD 432 through CXL.mem as shown by arrow 437.

Based on monitoring the L2P mapping 442, the monitor logic 420 may determine that one or more pages 422 of the device-attached memory 408 are hot pages that may be accessed relatively frequently by one or more processes using the process virtual memory 434. Based on this determination, the monitor logic 420 may send a migration signal 424 to the paging scheme 436 that may trigger a migration of the one or more hot pages 422 from the device-attached memory 408 to the system memory 410.

The one or more hot pages 422 may initially be mapped with an original mapping 444 prior to migration. Based on receiving the migration signal 424, the paging scheme 436 may modify the mapping 440 to migrate the one or more hot pages 422 to new locations 428 in the system memory 410 (as shown by arrow 430) using a new mapping 446 after the migration.

Figure 5:
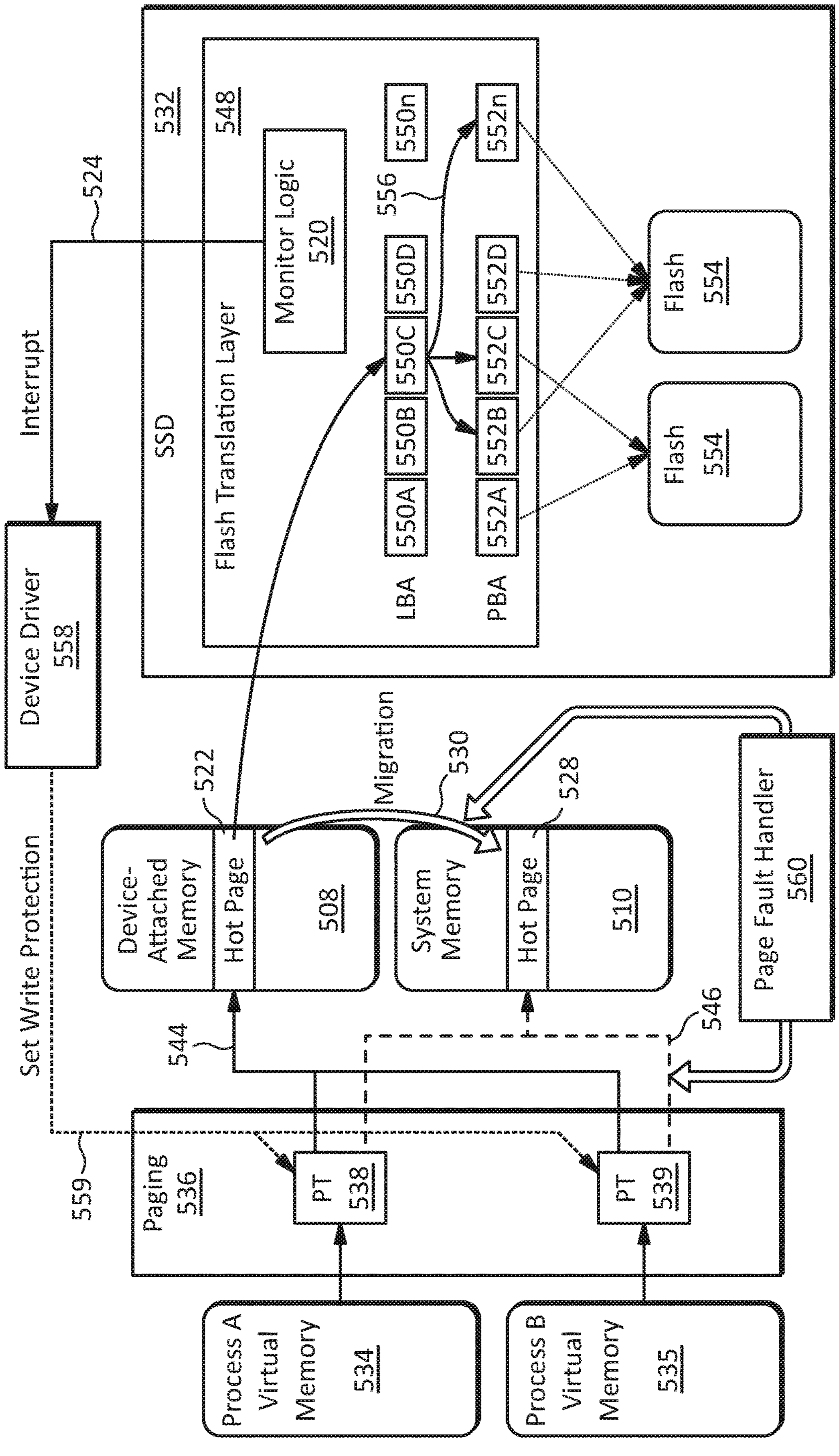
FIG. 5 illustrates another example embodiment of a heterogeneous memory scheme showing some possible implementation details for a page migration scheme in accordance with example embodiments of the disclosure.

FIG. 5 illustrates another example embodiment of a heterogeneous memory scheme showing some possible implementation details for a page migration scheme in accordance with example embodiments of the disclosure. The memory scheme illustrated in FIG. 5 may include a device-attached memory 508 and a system memory 510. The device-attached memory 508 may be implemented with one or more flash memory devices 554 in a CXL-enabled SSD 532 that may be exposed via a memory protocol such as CXL.mem. The system memory 510 may be implemented with volatile memory such as DRAM.

The device-attached memory 508 and system memory 510 may be mapped to a first process virtual memory 534 and a second process virtual memory 535 using a paging scheme 536 with page tables 538 and 539 that may provide a mapping to the device-attached memory 508 and system memory 510. The process virtual memories 534 and 535 may be used, for example, by a first process (Process A) and a second process (Process B), respectively, running on a host such as any of the hosts illustrated in FIG. 1, FIG. 2, and/or FIG. 3.

Referring again to FIG. 5, the device-attached memory may include one or more pages 522 that may initially be mapped to the process virtual memories 534 and 535 using an initial mapping illustrated by the solid lines 544.

The SSD 532 may include a flash translation layer (FTL) 548 that may map LBAs 550 to PBAs 552 of the one or more flash memory devices 554. The FTL 548 may include monitor logic 520 that may monitor the LBA-to-PBA mappings 556 to determine one or more usage patterns of one or more pages 522 of the device-attached memory 508. For example, the first time a page 522 associated with a specific LBA 550C is written to by a process using one of the process virtual memories 534 and 535, the FTL may map the LBA 550C to a first PBA 552B. The next time the page 522 is written to, the FTL may change the mapping so LBA 550C is mapped to a second PBA 552C. The next time the page 522 is written to, the FTL may again change the mapping so LBA 550C is mapped to a third PBA 552*n*.

Thus, the monitor logic 520 may determine that one or more pages 522 of the device-attached memory 508 may be hot pages that are frequently accessed. In some embodiments, the monitor logic 520 may monitor some or all of the LBA-to-PBA mappings 556 to establish an average number of mapping updates per page or other metric to determine a usage pattern for pages of the device-attached memory 508. The monitor logic 520 may use the average or other metric as a threshold to which it may compare individual monitored pages. The monitor logic 520 may determine that a specific page is a hot page if the number of LBA-to-PBA mappings 556 for that specific page exceeds the threshold (for example, on a total cumulative basis, during a rolling time window, and/or the like).

When the monitor logic 520 determines that one or more pages 522 of the device-attached memory 508 are hot pages, the monitor logic 520 may trigger a migration by sending a migration message 524 to a device driver 558 for the SSD 532, for example, at a host on which Process A and/or Process B may be running. In the example illustrated in FIG. 5, the migration message 524 may be implemented as an interrupt (e.g., a hardware interrupt).

Based on receiving the interrupt 524, the device driver 558 may begin a process to use a page fault handler 560 to migrate one or more hot pages 522 from the device-attached memory 508 to the system memory 510. In some embodiments, the page fault handler 560 may be implemented as system software (e.g., as a component of an operating system kernel) that may be called when a page fault occurs. Page faults may occur for various reasons. Therefore, based on receiving the interrupt 524, the driver 558 may set a protection bit for a hot page to cause a page fault when an application attempts to access the page.

In some embodiments, a page fault handler 560 may be used to swap pages between system memory 510 and a storage device. For example, if one of Process A or Process B attempts to access a requested page of system memory 510 that has been moved to the storage device, it may generate a page fault. Based on the page fault, the page fault handler 560 may retrieve the requested page from the storage device and swap it into the system memory 510 to make it available to the requesting process.

The embodiment illustrated in FIG. 5 may take advantage of the page fault handler 560 (which may have already existed in the system) by adapting it to perform a hot page migration in accordance with example embodiments of the disclosure.

In this example, the device driver 558 may set a write protection status (for example, using a write protection bit) for each hot page 522 in the device-attached memory 508 detected by the monitor logic 520. The write protection status may be set in each of the page tables 538 and 539 as in the page table as shown by arrows 559. This may set a software trap that may be activated when a process attempts to write to one or more of the hot pages 522 that have been write protected. Based on a write attempt to one of the write protected pages 522, the page fault handler may migrate the one or more hot pages 522 from the device-attached memory 508 to one or more new locations 528 in the system memory 510, for example, by moving the page data from the device-attached memory 508 to the system memory 510 as shown by arrow 530 and replacing the original mapping 544 with a new mapping as shown by the dashed lines 546.

In some embodiments, the memory scheme illustrated in FIG. 5 may implement a passive (e.g., an efficiently passive) page migration scheme in which a page 522, having been identified as a hot page, is marked for migration (e.g., by marking it as write-protected). However, the hot page 522 may not actually be migrated until it may be needed by a process as indicated, for example, by an attempted write of the hot page.

Figure 6:
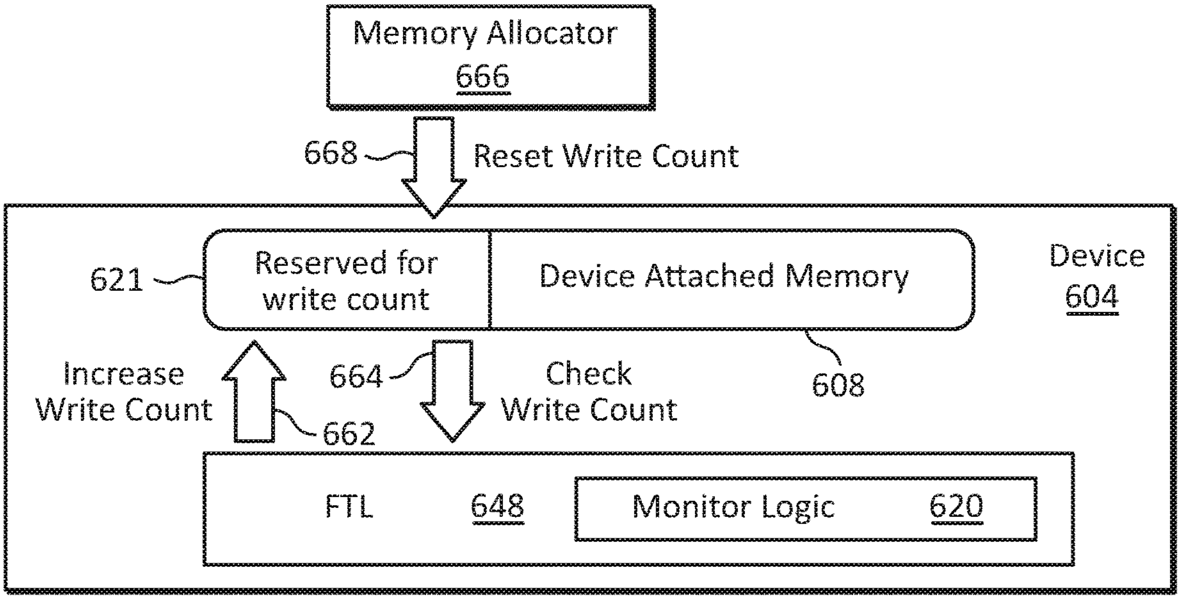
FIG. 6 illustrates an embodiment of a system for storing information for determining a usage pattern for one or more memory pages in accordance with example embodiments of the disclosure.

FIG. 6 illustrates an embodiment of a system for storing information for determining a usage pattern for one or more memory pages in accordance with example embodiments of the disclosure. In the system illustrated in FIG. 6, a device 604 may include a device-attached memory 608 which may be exposed, for example, through a memory protocol such as CXL.mem. A reserved portion 621 of the device-attached memory 608 may be reserved for information such as a write count which may be used to determine a usage pattern for one or more pages of a first type of memory. In some embodiments, the device 604 may be implemented as an SSD having an FTL 648 with monitoring logic 620. The monitoring logic 620 may increase the write count for a page as shown by arrow 662 each time it detects a changed L2P mapping for the page. The monitoring logic 620 may also check the write count for a page as shown by arrow 664 each time it detects a changed L2P mapping for the page, for example, to determine if the write count for the page has reached a threshold indicating that the page may be considered a hot page. The monitoring logic may then send a migration message based on detecting a hot page.

A memory allocator 666, which may be located, for example, at a host, may reset the write count for a page as shown by arrow 668, for example, by sending an update message, when a page is deallocated and therefore may no longer be used by an application and/or a process at the host.

Figure 7:
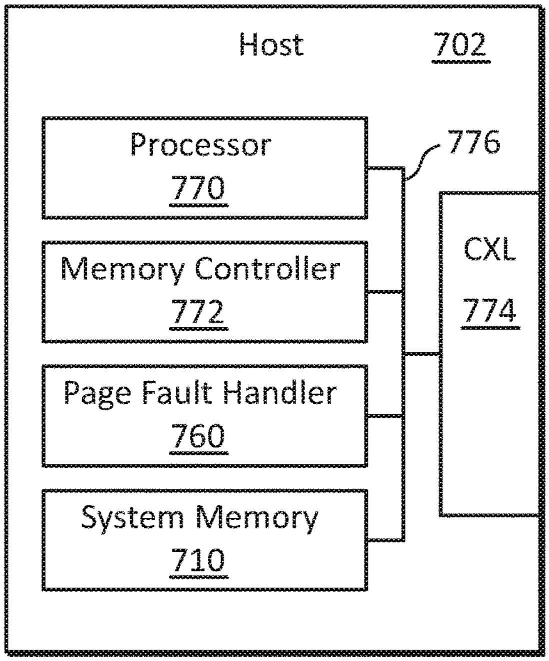
FIG. 7 illustrates an example embodiment of a host apparatus that may be used to implement a page migration scheme in accordance with example embodiments of the disclosure.

FIG. 7 illustrates an example embodiment of a host apparatus that may be used to implement a page migration scheme in accordance with example embodiments of the disclosure. The host apparatus 702 illustrated in FIG. 7 may include a processor 770, a memory controller 772, a page fault handler 760, a system memory 710, and a interconnect interface 774, which may be implemented, for example using CXL. Any or all of the components illustrated in FIG. 7 may communicate through a system bus 776. In some embodiments, the host apparatus 702 illustrated in FIG. 7 may be used to implement any of the host functionality disclosed herein including any of the processing, mapping, paging, page fault handling, interrupt handling, and/or memory allocation functionality disclosed in the embodiments illustrated in FIGS. 1 through 6.

Figure 8:
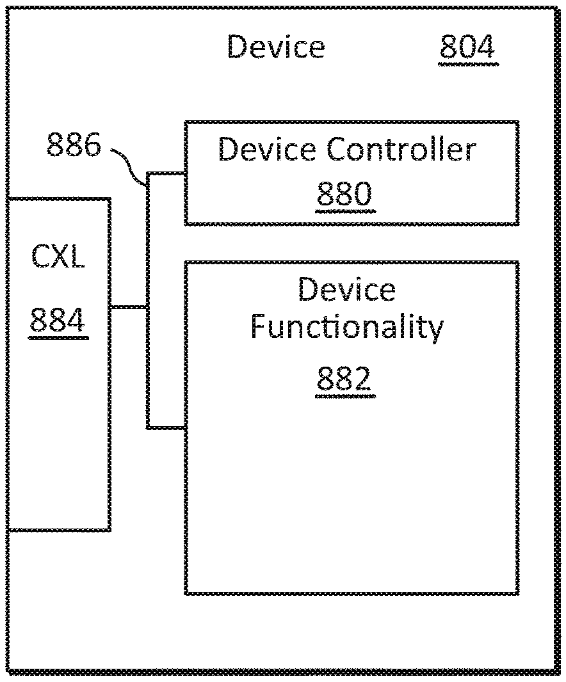
FIG. 8 illustrates an example embodiment of a device that may be used to implement a page migration scheme in accordance with example embodiments of the disclosure.

FIG. 8 illustrates an example embodiment of a device that may be used to implement a page migration scheme in accordance with example embodiments of the disclosure. The device 804 illustrated in FIG. 8 may include a device controller 880, a device functionality circuit 882, and an interconnect interface 884. Any or all of the components illustrated in FIG. 8 may communicate through a system bus 886. The device functionality circuit 882 may include any hardware to implement the function of the device 802. For example, if the device 802 is implemented as a storage device, the device functionality circuit 882 may include a storage medium such as one or more flash memory devices, an FTL, and/or the like. As another example, if the device 804 is implemented as a network interface card (NIC), the device functionality circuit 882 may include one or more modems, network interfaces, physical layers (PHYs), medium access control layers (MACs), and/or the like. As a further example, if the device 804 is implemented as an accelerator, the device functionality circuit 882 may include one or more accelerator circuits, memory circuits, and/or the like. In some embodiments, the device 804 illustrated in FIG. 8 may be used to implement any of the functionality relating to devices and/or device-attached memory disclosed herein, including any such functionality disclosed in FIGS. 1-6.

In embodiments in which the device 804 may be implemented as a storage device, the storage device may be based on any type of storage media including magnetic media, solid state media, optical media, and/or the like. For example, in some embodiments, the device 804 may be implemented as an SSD based on NAND flash memory, persistent memory such as cross-gridded nonvolatile memory, memory with bulk resistance change, phase change memory (PCM) and/or the like, and/or any combination thereof. Such a storage device may be implemented in any form factor such as 3.5 inch, 2.5 inch, 1.8 inch, M.2, Enterprise and Data Center SSD Form Factor (EDSFF), NF1, and/or the like, using any connector configuration such as Serial ATA (SATA), Small Computer System Interface (SCSI), Serial Attached SCSI (SAS), U.2, and/or the like. Such a storage device may be implemented entirely or partially with, and/or used in connection with, a server chassis, server rack, dataroom, datacenter, edge datacenter, mobile edge datacenter, and/or any combinations thereof, and/or the like.

Any of the functionality described herein, including any of the host functionality, device functionally, and/or the like described in FIGS. 1-8 may be implemented with hardware, software, or any combination thereof including combinational logic, sequential logic, one or more timers, counters, registers, state machines, volatile memories such as dynamic random access memory (DRAM) and/or static random access memory (SRAM), nonvolatile memory such as flash memory including NAND flash memory, persistent memory such as cross-gridded nonvolatile memory, memory with bulk resistance change, and/or the like, and/or any combination thereof, complex programmable logic devices (CPLDs), field programmable gate arrays (FPGAs), application specific integrated circuits (ASICs), central processing units (CPUs) such as complex instruction set computer (CISC) processors such as x86 processors and/or reduced instruction set computer (RISC) processors such as ARM processors, graphics processing units (GPUs), neural processing units (NPUs), and/or the like, executing instructions stored in any type of memory. In some embodiments, one or more components may be implemented as a system-on-chip (SOC).

Figure 9:
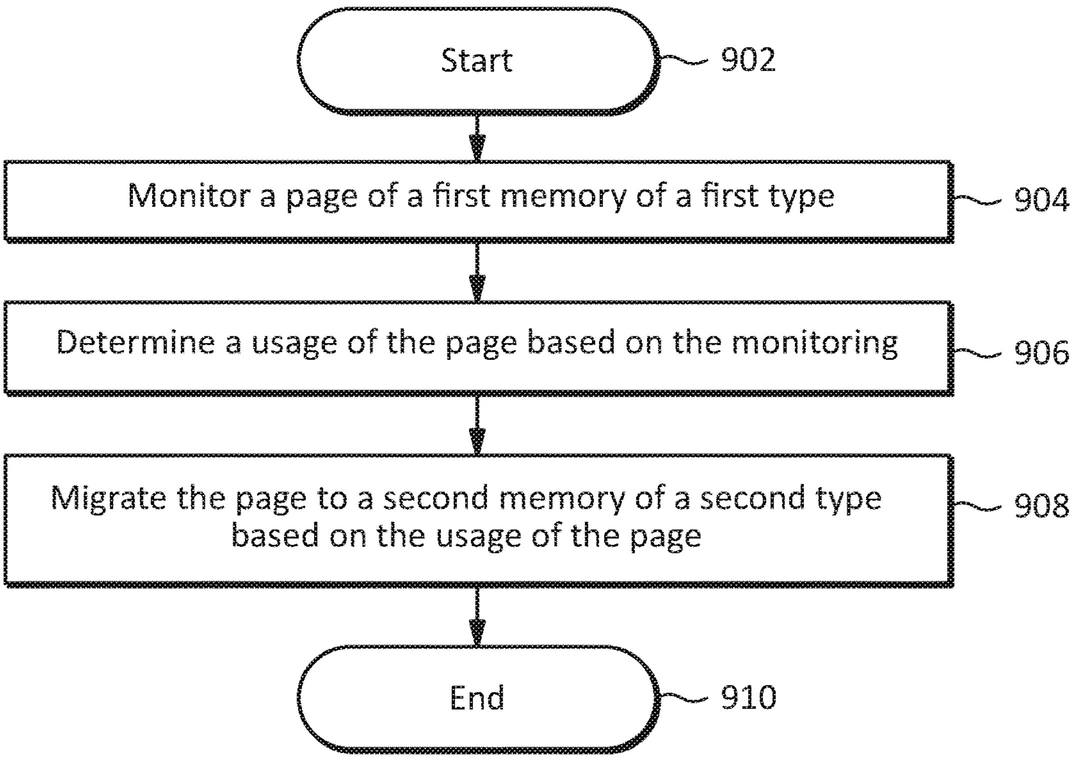
FIG. 9 illustrates an embodiment of a method for managing a memory system in accordance with example embodiments of the disclosure.

FIG. 9 illustrates an embodiment of a method for managing a memory system in accordance with example embodiments of the disclosure. The method may begin at operation 902. At operation 904, the method may monitor a page of a first memory of a first type. For example, in some embodiments, the method may monitor a write count for a page of device-attached nonvolatile memory. At operation 906, the method may determine a usage of the page based on the monitoring. For example, in some embodiments, the method may determine that the page may be a hot page that has been accessed frequently based on changes in logical-to-physical mappings for the page. At operation 908, the method may migrate the page to a second memory of a second type based on the usage of the page. For example, in some embodiments, the method may migrate the hot page from the nonvolatile memory to a volatile memory. The method may end at operation 910.

The embodiment illustrated in FIG. 9, as well as all of the other embodiments described herein, are example operations and/or components. In some embodiments, some operations and/or components may be omitted and/or other operations and/or components may be included. Moreover, in some embodiments, the temporal and/or spatial order of the operations and/or components may be varied. Although some components and/or operations may be illustrated as individual components, in some embodiments, some components and/or operations shown separately may be integrated into single components and/or operations, and/or some components and/or operations shown as single components and/or operations may be implemented with multiple components and/or operations.

Some embodiments disclosed above have been described in the context of various implementation details, but the principles of this disclosure are not limited to these or any other specific details. For example, some functionality has been described as being implemented by certain components, but in other embodiments, the functionality may be distributed between different systems and components in different locations and having various user interfaces. Certain embodiments have been described as having specific processes, operations, etc., but these terms also encompass embodiments in which a specific process, operation, etc. may be implemented with multiple processes, operations, etc., or in which multiple processes, operations, etc. may be integrated into a single process, step, etc. A reference to a component or element may refer to only a portion of the component or element. For example, a reference to an integrated circuit may refer to all or only a portion of the integrated circuit, and a reference to a block may refer to the entire block or one or more subblocks. The use of terms such as "first" and "second" in this disclosure and the claims may only be for purposes of distinguishing the things they modify and may not indicate any spatial or temporal order unless apparent otherwise from context. In some embodiments, a reference to a thing may refer to at least a portion of the thing, for example, "based on" may refer to "based at least in part on," and/or the like. A reference to a first element may not imply the existence of a second element. The principles disclosed herein have independent utility and may be embodied individually, and not every embodiment may utilize every principle. However, the principles may also be embodied in various combinations, some of which may amplify the benefits of the individual principles in a synergistic manner.

The various details and embodiments described above may be combined to produce additional embodiments according to the inventive principles of this patent disclosure. Since the inventive principles of this patent disclosure may be modified in arrangement and detail without departing from the inventive concepts, such changes and modifications are considered to fall within the scope of the following claims.

The invention claimed is:

1. A method for managing a memory system, the method comprising:

receiving a command at a first memory, the command sent from a host processor;

monitoring a page of the first memory of a first type based on the command;

determining a usage of the page based on the monitoring, the usage of the page based at least in part on data being updated by the host processor; and migrating the page to a second memory of a second type based on the usage of the page, wherein the first memory includes a first logical-to-physical translation table to map a first logical address used by the host processor to a first physical address used by the first memory; and the second memory includes a second logical-to-physical translation table to map a second logical address used by the host processor to a second physical address used by the second memory.

2. The method of claim 1, wherein monitoring the page comprises monitoring a mapping of the page by the host processor.

3. The method of claim 1, wherein determining the usage of the page comprises determining an update frequency of the page.

4. The method of claim 3, wherein determining the usage of the page comprises comparing the update frequency of the page to a threshold.

5. The method of claim 1, wherein migrating the page comprises sending an interrupt to a device driver.

6. The method of claim 1, wherein migrating the page comprises:

setting a write protection status for the page; and migrating the page, by a page fault handler, based on writing the page including the write protection status.

7. The method of claim 1, wherein the first memory comprises a device-attached memory.

8. The method of claim 7, wherein the device-attached memory is arranged to be accessed by the host processor via a memory protocol.

9. The method of claim 8, wherein the memory protocol comprises a coherent memory protocol.

10. The method of claim 1, wherein:

the first memory comprises a nonvolatile memory; and the second memory comprises a volatile memory.

11. A device comprising:

a first memory to receive a command sent from a host processor; and a device controller configured to:

monitor a page of the first memory based on the command;

determine a usage of the page based on the monitoring, the usage of the page based at least in part on the data being updated by the host processor; and send an indication based on the usage of the page, wherein the first memory includes a first logical-to-physical translation table to map a first logical address used by the host processor to a first physical address used by the first memory; and a second memory includes a second logical-to-physical translation table to map a second logical address used by the host processor to a second physical address used by the second memory.

12. The device of claim 11, wherein the device controller is configured to monitor the page by monitoring a mapping of the page.

13. The device of claim 12, wherein the device controller is configured to monitoring the mapping of the page by monitoring a logical address to physical address mapping of the page.

14. The device of claim 11, wherein the device controller is configured to determine the usage of the page by determining an update frequency of the page.

15. The device of claim 11, wherein:

the device comprises a storage device; and the first memory is arranged to be accessed by the host processor via a coherent memory protocol.

16. The device of claim 11, wherein the device controller is configured to store usage information for the page in the first memory.

17. The device of claim 16, wherein the device controller is configured to:

receive an update message; and update the usage information based on the update message.

18. A system comprising:

a host processor;

a first memory of a first type arranged to be accessed by the host processor, the first memory including a first logical-to-physical translation table to map a first logical address used by the host processor to a first physical address used by the first memory;

a device interface to a second memory of a second type, the second memory arranged to be accessed by the host processor, the second memory including a second logical-to-physical translation table to map a second logical address used by the host processor to a second physical address used by the second memory; and a migration logic configured to:

receive a migration message; and migrate a page of the second memory to the first memory based on the migration message.

19. The system of claim 18, wherein the migration logic comprises a device driver executing on the host processor configured to receive the migration message.

20. The system of claim 18, wherein the migration logic is configured to send an update message through a device interface based on migrating the page from the second memory to the first memory.

21. The method according to claim 2, wherein the mapping is stored on a storage device.

* * * * *